United States Patent [19]

Parulski et al.

[11] Patent Number: 5,001,663

[45] Date of Patent: Mar. 19, 1991

[54] PROGRAMMABLE DIGITAL CIRCUIT FOR PERFORMING A MATRIX MULTIPLICATION

[75] Inventors: Kenneth A. Parulski, Rochester; Robert H. Hibbard, Fairport; Lionel J. D'Luna, Rochester, all of N.Y.

[73] Assignee: Eastman Kodak Company, Rochester, N.Y.

[21] Appl. No.: 346,861

[22] Filed: May 3, 1989

[51] Int. Cl.⁵ .............................................. G06F 7/52
[52] U.S. Cl. ..................................... 364/760; 364/754
[58] Field of Search ................ 364/760, 759, 757, 754

[56] References Cited

U.S. PATENT DOCUMENTS

| | | | |
|---|---|---|---|
| 3,919,535 | 11/1975 | Vattuone | 364/760 |
| 4,118,785 | 10/1978 | Izumi et al. | 364/754 |
| 4,455,611 | 6/1984 | Powers | 364/760 |
| 4,507,676 | 3/1985 | Dischert et al. | 358/30 |
| 4,568,968 | 2/1986 | Ullrich | 358/30 |
| 4,589,019 | 5/1986 | Dischert et al. | 358/160 |
| 4,700,229 | 10/1987 | Herrmann et al. | 358/166 |

*Primary Examiner*—David M. Malzahn
*Attorney, Agent, or Firm*—David M. Woods

[57] ABSTRACT

The circuit includes a cascaded array of digital circuit blocks that together implement a matrix multiplication in each channel of a color video signal processing system. Each circuit block includes two registers for multiplying or dividing two input digital signals by respective powers of two according to programmable bit shifts. The resultant signals are arithmetically combined according to a programmable arithmetic function to provide an output signal. By mask programming the arithmetic function and the bit lenghts of the shifts for each block and by cascading the programmed blocks, the multipler coefficients of the matrix are established and the output signal represents a specified color matrix operation.

23 Claims, 3 Drawing Sheets

PROGRAMMABLE DIGITAL CIRCUIT FOR PERFORMING A MATRIX MULTIPLICATION

BACKGROUND OF THE INVENTION

1. Field of the Invention

This invention pertains to the field of digital signal processing and, in particular, to the matrix multiplication of a plurality of digital signals by a coefficient matrix of the type used in color video signal processing.

2. Background Art

Correction matrices are useful in a variety of color video applications. For instance, a conversion matrix is used to convert red, green, and blue video signals into Y (luminance) and I, Q (chrominance) signals. A color correction matrix is used to correct the spectral sensitivities of a video camera for the chromaticities of the phosphor set of the particular display in use. Another use is with film-to-video conversion, a process in which a color correction matrix operates on the film scanning signals to correct the film colorimetry for video display.

It is desirable for reasons of space and efficiency to implement the matrix in one, or a few, integrated circuits. A conventional approach is to use an array of multipliers, say nine multipliers, to implement a 3×3 matrix. This uses a prohibitive amount of circuit area (on an integrated circuit). The multipliers can be replaced with ROM (read only memory) look-up tables. This still takes too much area. Another approach approximates the matrix coefficients by simple shifting operations, which can be implemented digitally by "hardwired" right (or left) shift connections between registers that provide a "binary" matrix coefficient series, such as 1/32, 1/16, ⅛, ¼, ½, 1, 2, etc. Such poor coefficient accuracy can be improved by summing selected coefficients, but this requires many adders and many shifts. Once again, too much area is required.

In U.S. Pat. No. 4,507,676, a compromise solution is disclosed in which each coefficient is broken into two parts: a binary part and a remainder. The binary part is implemented by a "hardwired" right shift and the remainder is implemented by a ROM look-up table. While such an approach provides additional accuracy, it would be desirable to eliminate the ROM look-up tables altogether. Moreover, in view of the disparate applications for video matrices, it would be greatly preferred to have a universal matrix chip that could be used for a variety of applications with a minimum of redesign.

SUMMARY OF THE INVENTION

The invention departs from the prior art by mask-programming both the shifts and an arithmetic function in a simple, area-conserving configuration that lends itself to cascading, both for increased accuracy and ease of matrix implementation. The basis of the approach is the realization that by either adding or subtracting two "hardwired" shifted inputs, it is possible to obtain most of the desired matrix coefficients with a very small amount of circuitry. For instance, two input digital signals are separately multiplied or divided by programmable powers of two according to programmable bit shifts, yielding first and second intermediate signals. The intermediate signals are then arithmetrically combined according to a programmable arithmetic function, say addition or subtraction, to provide a product signal. By selecting the arithmetic function and defining the bit lengths of the shifts, the multiplier coefficient, or a component thereof, is established.

This programmable circuit becomes a "building block" in which a plurality of like circuits are cascaded such that the output of one becomes the input to another for all but one such circuit that provides the matrix output signal. In such manner, the accuracy of each coefficient may be improved and at least one channel (row) of a matrix may be implemented. A multi-row matrix is obtained by driving several cascaded chains in parallel across a plurality of signal channels.

BRIEF DESCRIPTION OF THE DRAWINGS

The invention will be described in relation to the drawings, in which.

DETAILED DESCRIPTION OF A PREFERRED EMBODIMENT

Figure 1:
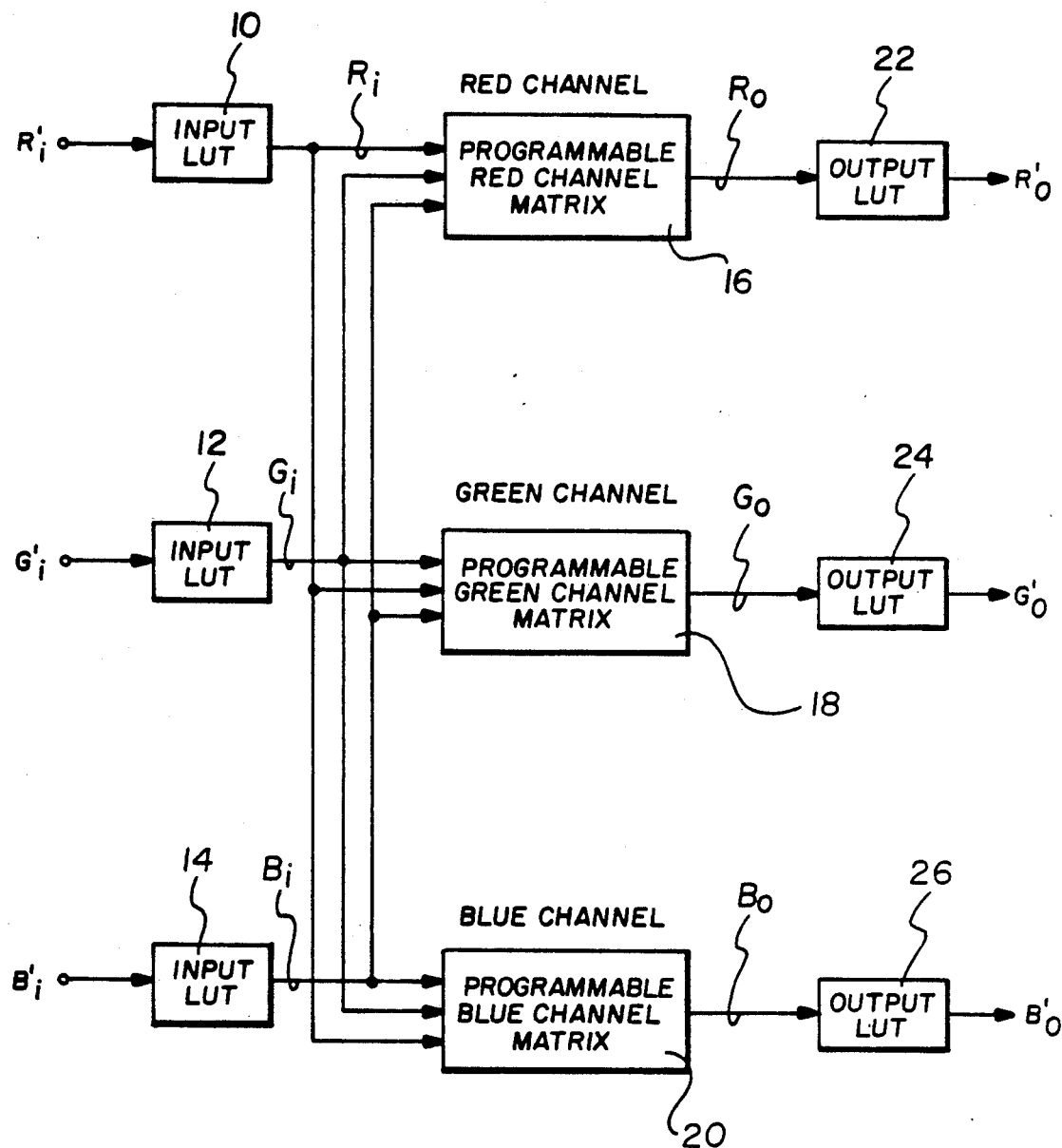
FIG. 1 is a block diagram of a multi-channel video matrix circuit for performing a color correction.

Referring first to FIG. 1, a typical video matrix application is shown in which the matrix coefficients correct the spectral sensitivities of a video camera for the chromaticities of a particular phosphor display. The matrix is implemented in separate red, green and blue channels, as shown. A set of input signals $R'_i$, $G'_i$, and $B'_i$ from a video camera (not shown) are applied to separate ROM (read only memory) look-up tables 10, 12 and 14, which convert the input signals from the input mathematical space to a linear mathematical space. Since the preferred embodiment is used with logarithmic input signals, the tables 10, 12, and 14 convert the respective input log signals to a set of linear signals $R_i$, $G_i$, and $B_i$. A color correction matrix is implemented row-by-row across the separate channels by a programmable red channel matrix 16, a programmable green channel matrix 18, and a programmable blue channel matrix 20. The linear signals $R_i$, $G_i$, and $B_i$ are applied to each of the matrixes 16, 18, and 20 for multiplication by an array of coefficients $a_{ij}$. The color correction matrix operation is shown in equation (1), $$\begin{matrix} R_o \\ G_o \\ B_o \end{matrix} = \begin{matrix} a_{11} \, a_{21} \, a_{31} \\ a_{12} \, a_{22} \, a_{32} \\ a_{13} \, a_{23} \, a_{33} \end{matrix} \begin{matrix} R_i \\ G_i \\ B_i \end{matrix} \quad (1)$$

where $R_o$, $G_o$, and $B_o$ are the signals output from the respective matrix circuits 16, 18, and 20.

The coefficients $a_{ij}$ depend on the color-mixture functions of the phosphors used in the television display and the spectral sensitivities of the three color signals from the video camera, which includes the optics and the sensor. The coefficients can be positive or negative. In general, negative off-diagonal coefficients increase the color saturation of the image. Since it is ordinarily desirable to keep the sum of the coefficients in a given row equal to one, the diagonal coefficient is made greater than one to offset the negative off-diagonal coefficients. In this embodiment, the coefficients are selected as shown in equation (2) for improved color rendition and color saturation, $$\begin{pmatrix} R_o \\ G_o \\ B_o \end{pmatrix} = \begin{pmatrix} 13/8 & -1/4 & -3/8 \\ -1/16 & 21/16 & -1/4 \\ -1/32 & -1/2 & 49/32 \end{pmatrix} \begin{pmatrix} R_i \\ G_i \\ B_i \end{pmatrix} \quad (2)$$

where the coefficients $a_{ij}$ are selected for color correction in relation to a SMPTE "C" phosphor display, that is, a phosphor characteristic established by the Society of Motion Picture and Television Engineers.

Figure 2:
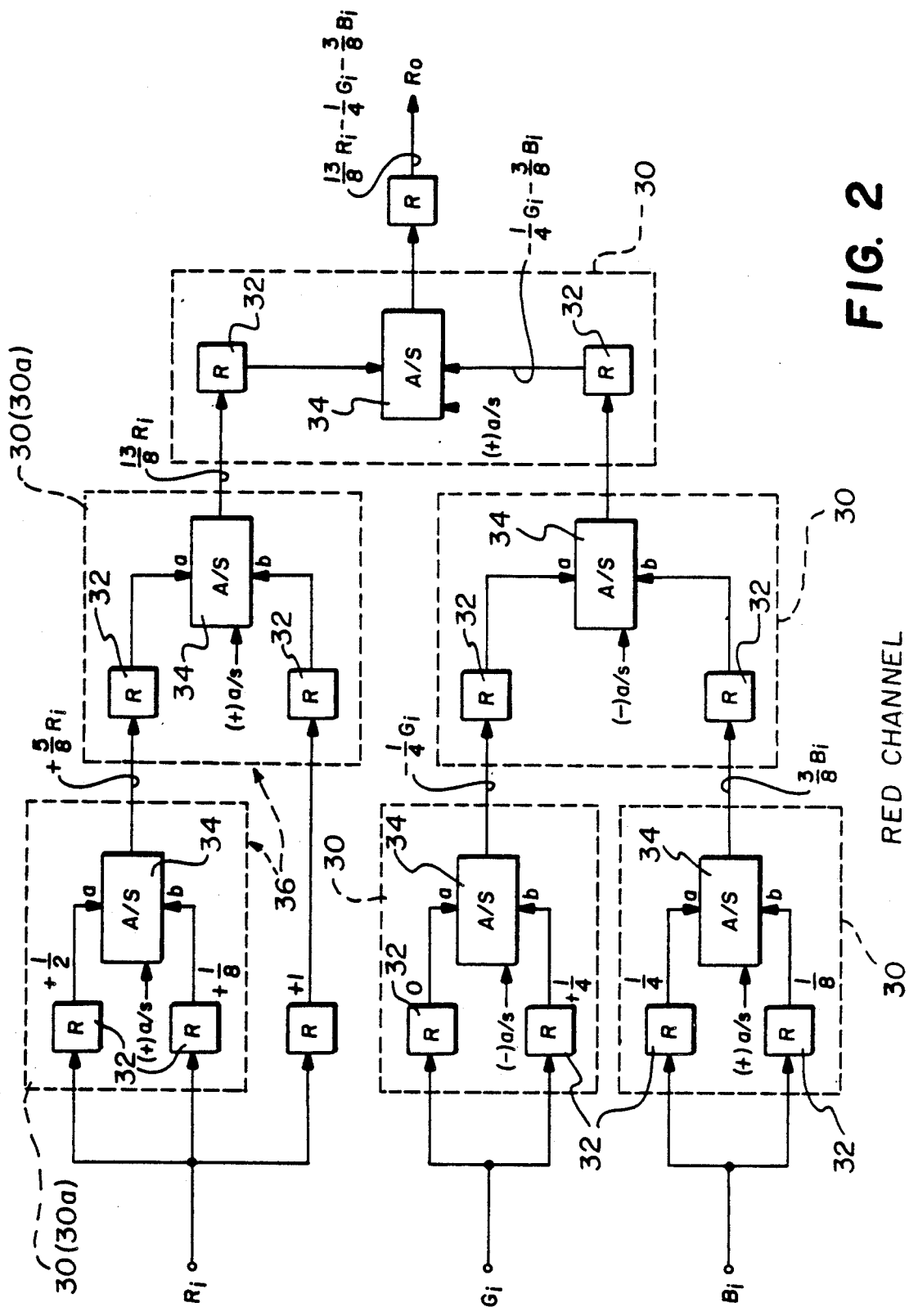
FIG. 2 is a detailed diagram of the programmable matrix in the red channel shown in FIG. 1.

Each matrix 16, 18, and 20 implements a respective row of the matrix multiplication. For this reason, all signals $R_i$, $G_i$, and $B_i$ are applied to each matrix 16, 18, and 20. The matrix operation uses constrained shift and add/subtract operations together with pipelining and parallelism as shown in FIG. 2 (for the red channel). This architecture avoids the use of multipliers. The coefficients are metal mask programmable between $+/-1/32$ and $+/-2$ at discrete (not necessarily equal) increments. The programmability allows the matrix circuit to be used with different image sensor spectral sensitivities or with different types of displays by changing a single mask. The matrix output signals $R_o$, $G_o$, and $B_o$ are then gamma-corrected in respective linear to gamma ROM look-up tables 22, 24, and 26, which provide suitable curve shape transformations to adjust the non-linear contrast relationship between the signal voltages at the input and the light values at the output of the system. The gamma-corrected output signals $R'_o$, $G'_o$, and $B'_o$ are suitably connected to a video display (not shown).

In FIG. 1, the full matrix is shown implemented in three 1×3 matrix channels. Referring now to FIG. 2, the 1×3 red matrix channel is shown in greater detail. The red matrix channel (as well as the green and blue matrix channels) includes metal mask programmable shift/add/subtract digital blocks, each basically identical and identified by the reference character 30. Each digital block 30 includes two registers 32 with mask programmable input shifts, each register basically identical except for the programmed shifts, and a mask programmable arithmetic unit 34. The registers 32 are mask programmed to provide the divisions as shown, i.e., a shift of one bit for ½, two bits for ¼, three bits for ⅛, etc. The arithmetic unit 34 includes data inputs a and b, the input b capable of being negated by mask programming of a control input a/s thereof.

As shown in FIG. 2, the digital blocks 30 are cascaded whereby the output of one becomes the input to another, excepting for the last digital block 30, which provides the matrix output signal $R_o$ (i.e., $R_o 13/8 R_i \frac{1}{4} G_i \frac{3}{8} B_i$). It is further shown that the diagonal coefficient $a_{11}$ (equation (1)) is calculated by the cascaded arrangement 36 of two blocks 30a and 30b. According to the arrangement 36, the red input signal $R_i$ is directed to both inputs of the upstream digital block 30a and one input of the following downstream block 30b. This is useful in providing coefficients of greater than one. The green and blue channel matrices are implemented with an architecture identical to that shown in FIG. 2, except that the cascaded arrangement 36 is provided for either the green or blue input signal $G_i$ or $B_i$, respectively, instead of for the red input signal $R_i$. The shifts and the arithmetic functions are of course altered as necessary to obtain the desired coefficients.

Figure 3:
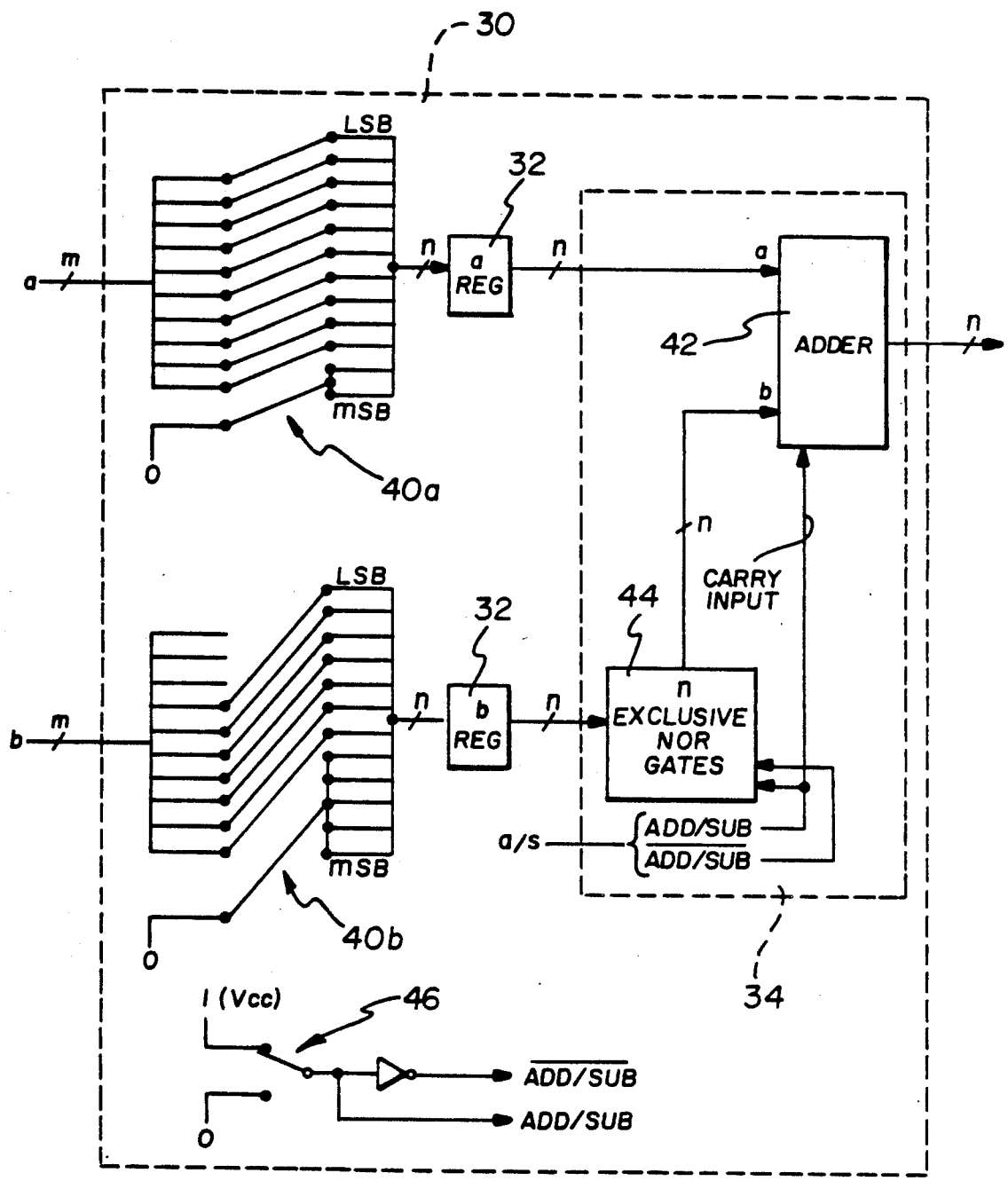
FIG. 3 illustrates one of the programmable circuit blocks shown in FIG. 2.

FIG. 3 shows one of the digital blocks 30 in greater detail. The input bit resolution m and the output bit resolution n depend on whether the block 30 is an input, middle, or output block in the matrix channel, as shown in FIG. 2. For instance, the blocks 30 connected to the inputs $R_i$, $G_i$ and $B_i$ have m=10 input bits and n=12 output bits. FIG. 3 shows the internal construction of the block 30 and how the matrix coefficient "7/32" is mask programmed. The registers 32 include mask programmable input arrays identified as "hardwired" inputs 40a and 40b. Simple metal mask level alterations provide multiplication or division by a programmable power of two, that is, multiplication by $2^n$ for a number (n) of left shifts or division by $\frac{1}{2}^n$ for a number(n) of right shifts.

The arithmetic unit 34 includes an adder 42 and an array 44 of n exclusive NOR gates, which together form a 2's complement adder. The adder 42 has one input a of n bits connected to the output of the "a" register 32 and a second input b of n bits connected to the array 44 of NOR gates, which are in turn connected to the output of the "b" register 32. The array 44 of NOR gates and the adder 42 receive a negating input ADD/SUB ("a/s" in FIG. 2) from a sign generator 46. For mask programming of "7/32", the input 40a is "hardwired" by a simple metal mask level change to shift right two places to implement "x ¼" while the input 40b is "hardwired" to shift right five places to implement "x 1/32". The most significant bits (MSB) thus bypassed in the shift are set to zero by "hardwiring" a digital "zero". The sign generator 46 is "hardwired" to digital "1" ($V_{cc}$) to implement a negation (providing "x−1/32"). This sets the ADD/SUB line=1, so that the array 44 of exclusive NOR gates inverts the signal to the input b and the adder carry input of the adder 42 is set to 1, thus providing the proper 2's complement subtraction. In the opposite case, when the sign generator 46 is "hardwired" to digital "O", the ADD/SUB line=0 and the adder 42 effects an addition (providing "9/32"). Alternately, an array of exclusive OR gates could be used in place of the array 44 of exclusive NOR gates if the ADD/SUB control lines are reversed, as is well known to those skilled in the art of digital circuit design.

FIGS. 1-3 show how the programmable digital circuit is mask programmed for color correction in a video camera application. The programmable digital circuit could also be mask programmed as a conversion matrix to convert red, green and blue video signals into Y (luminance) and I, Q (chrominance) signals. The input look-up tables 10, 12, and 14 would be mask programmed for gamma correction and the output look-up tables 22, 24, and 26 would be mask programmed for a unity, or "straight line", curve transformation. The selection of suitable matrix coefficients for such a conversion is well within the ordinary skill of this art. Another application would be in a film to video conversion, such as for a telecine machine. In this case log masking is required because the red, green, and blue video signals are being mapped through the approximately logarithmic characteristic curve of a film system to determine the red, green and blue recorded from the original scene, that is, the actual dye amounts formed in the image. The input look-up tables 10, 12, and 14 would be mask programmed for a "straight line" curve transformation, thus keeping the input signals $R_i$, $G_i$, and $B_i$ in log space. The logarithmically quantized signals are next matrixed with a 3×3 color correction matrix which has been mask programmed in order to properly correct the film colorimetry for video display. A suitable array of coefficients is well known in the art and thus not set forth here. The output look-up tables 22, 24, and 26 would then be mask programmed to convert the log signals into gamma corrected signals.

Another application is in the conversion of the input signal from the color and tone scale of the instantaneously available video image to a color and tone scale matching a desired non-video output medium. For instance, in an apparatus where an image is simultaneously captured on film and with a video camera, the color and tone scale of the video image should match the appearance of the photographic print which will eventually be made. The linear signals $R_i$, $G_i$, and $B_i$ are multiplied by a 3×3 color correction matrix which has been mask programmed in order to best correct the spectral sensitivities of the camera so that the display colors are similar to the color reproduction of prints from film. A suitable set of coefficients can be selected or estimated from a knowledge of the required transformation, such knowledge being within the conventional teaching in this art. The output ROM look-up tables 22, 24, and 26 are mask programmed to convert from linear space to a "gamma corrected" space matched to the curve shape of the output medium (e.g., a photographic paper), so that the video display tone scale will match the print tone scale.

The invention has been described in detail with particular reference to a presently preferred embodiment, but it will be understood that variations and modifications can be effected within the spirit and scope of the invention.

What is claimed is:

1. A programmable digital circuit for obtaining the product of an input digital signal and a multiplier coefficient, said circuit comprising:
   first shifting means for multiplying or dividing said input digital signal by a programmable power of two, said first shifting means producing a first intermediate signal by bit shifting the input digital signal over a first bit length;
   second shifting means for multiplying or dividing said input digital signal by a programmable power of two, said second shifting means producing a second intermediate signal by bit shifting the input digital signal over a second bit length;
   arithmetic means for combining said first and second intermediate signals according to a programmable arithmetic function to provide a product signal; and
   programmable means for selecting said arithmetic function and defining said first and second bit lengths thereby to establish the multiplier coefficient.

2. A circuit as claimed in claim 1 in which at least one of said first and second shifting means comprises a register having alterable mask level input connections.

3. A circuit as claimed in claim 2 in which said programmable means comprises metal mask level connections defining said alterable mask level input connections.

4. A circuit as claimed in claim 1 in which said arithmetic means comprises an adder arranged to receive said first and second intermediate signals at separate inputs thereof.

5. A circuit as claimed in claim 4 in which said arithmetic means includes means for negating one of said first and second intermediate signals.

6. A circuit as claimed in claim 5 in which said negating means includes an exclusive NOR gate interposed in the signal path between one of said shifting means and one of the inputs to said adder, said NOR gate activated according to the condition of a sign bit input thereto.

7. A circuit as claimed in claim 6 in which the sign bit is provided by a sign generator having alterable mask level connections to either of two sign potentials.

8. A circuit as claimed in claim 6 in which said programmable means comprises a metal mask level connection to either of said sign potentials.

9. A circuit as claimed in claim 1 for use in a matrix multiplication wherein said arithmetic function and said first and second bit lengths selected by said programmable means establishes either a matrix coefficient or a component thereof.

10. A matrix circuit for digitally multiplying a plurality of digital input signals by an array of matrix coefficients to obtain a plurality of digital output signals, said matrix circuit comprising:
    a plurality of signal processing channels, each signal processing channel operating upon said plurality of input signals with a cascaded arrangement of programmable multiplier circuits, each multiplier circuit comprising:
      first shifting means for multiplying or dividing a selected one of said digital input signals by a programmable power of two by bit shifting said selected digital input signal to obtain a first intermediate signal;
      second shifting means for multiplying or dividing said selected digital input signal by a programmable power of two by bit shifting said selected digital input signal to obtain a second intermediate signal;
      arithmetic means for combining said first and second intermediate signals according to a programmable arithmetic function; and
      programmable means for selecting said arithmetic function and defining said first and second bit shifts;
    wherein the multiplier circuits in each channel are cascaded such that the output signal of one becomes the input signal of another for all but one multiplier circuit which produces the matrix output signal for that channel, said cascading operative in combination with said programmable means to establish the array of matrix coefficients.

11. A circuit as claimed in claim 10 in which said first and second shifting means comprise respective registers having alterable mask level input connections.

12. A circuit as claimed in claim 11 in which said programmable means includes metal mask level connections for defining said alterable mask level input connections to said registers.

13. A circuit as claimed in claim 10 in which said arithmetic means comprises an adder arranged to receive said first and second intermediate signals at separate inputs thereof.

14. A circuit as claimed in claim 13 in which said arithmetic means includes means for negating one of said first and second intermediate signals.

15. A circuit as claimed in claim 14 in which said negating means includes an exclusive NOR gate interposed in the signal path between one of said shifting means and one of the inputs to said adder, said NOR gate activated according to the condition of a sign bit input thereto.

16. A circuit as claimed in claim 15 in which the sign bit is provided by a sign generator.

17. A circuit as claimed in claim 15 in which said programmable means includes metal mask level connections providing either of two signal potentials to said sign generator.

18. A circuit as claimed in claim 10 further including an input look-up table memory connected to precede the matrix circuit in at least one channel for converting the digital input signals from an input mathematical space to a processing space suitable for the matrix multiplication.

19. A circuit as claimed in claim 18 wherein said digital input signals are image signals having tone and color characteristics, said circuit further including an output look-up table memory for receiving said matrix output signal from at least one channel and modifying the tone scale of said output signal.

20. A circuit as claimed in claim 19 in which at least one of said input and output look-up table memories is programmable for different applications.

21. A circuit as claimed in claim 20 wherein said image signals are video image signals, and in which said matrix coefficients and said input and output look-up table memories are so programmed as to effect a conversion of the input signals from a color and a tone scale of a video image to a color and a tone scale matching a non-video output medium.

22. A circuit as claimed in claim 10 wherein said digital input signals are image signals having a color characteristic, and in which said programmable means selects an arithmetic function and defines first and second bit shifts that establish a matrix coefficient for effecting a color correction.

23. A circuit as claimed in claim 22 in which said programmable means selects an arithmetic function and defines first and second bit shifts that establish a matrix coefficient for effecting a conversion of color signals into luminance and chrominance signals.

* * * * *